US012709258B2

(12) United States Patent
Ahn

(10) Patent No.: US 12,709,258 B2
(45) Date of Patent: Aug. 18, 2026

(54) ELECTRONIC HYDRAULIC BRAKE APPARATUS

(71) Applicant: HYUNDAI MOBIS CO., LTD., Seoul (KR)

(72) Inventor: Sung Ki Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 353 days.

(21) Appl. No.: 18/414,825

(22) Filed: Jan. 17, 2024

(65) Prior Publication Data

US 2025/0050856 A1 Feb. 13, 2025

(30) Foreign Application Priority Data

Aug. 8, 2023 (KR) ........................ 10-2023-0103429

(51) Int. Cl.

*B60T 13/58* (2006.01)
*B60T 8/171* (2006.01)
*B60T 13/14* (2006.01)
*B60T 13/68* (2006.01)

(52) U.S. Cl.

CPC .............. *B60T 13/58* (2013.01); *B60T 8/171* (2013.01); *B60T 13/142* (2013.01); *B60T 13/686* (2013.01); *B60T 2270/402* (2013.01)

(58) Field of Classification Search

CPC ............. B60T 13/58; B60T 13/66–686; B60T 13/14–148; B60T 13/745; B60T 8/171; B60T 2270/402; B60T 7/042; B60T 17/22–223

See application file for complete search history.

(56) References Cited

U.S. PATENT DOCUMENTS 4,435,021 A * 3/1984 Hoenick ................. F16D 65/18 303/DIG. 10
2018/0273014 A1* 9/2018 Boulivan .............. B60T 8/1701
2020/0331442 A1* 10/2020 Cheon ..................... B60T 8/885
2021/0101575 A1* 4/2021 Ahn ...................... B60T 13/683
2021/0122346 A1* 4/2021 Ahn ...................... B60T 13/686
2022/0126803 A1* 4/2022 Cheon ..................... B60T 8/885
2022/0144234 A1* 5/2022 Ahn ...................... B60T 13/662

FOREIGN PATENT DOCUMENTS

KR 10-2007-0104982 A 10/2007

* cited by examiner

*Primary Examiner* — David R Morris

(74) *Attorney, Agent, or Firm* — Morgan, Lewis & Bockius LLP

(57) ABSTRACT

Proposed is an electronic hydraulic brake apparatus including a primary brake unit providing a brake fluid to a plurality of wheel cylinder units, a storage unit connected to the primary brake unit, the brake fluid being stored in the storage unit, and an auxiliary brake unit selectively connected to the primary brake unit and, in a case where an operating error of the primary brake unit occurs, providing the brake fluid stored in the auxiliary brake unit itself to the wheel cylinder unit.

20 Claims, 9 Drawing Sheets

ELECTRONIC HYDRAULIC BRAKE APPARATUS

CROSS-REFERENCE TO RELATED APPLICATION

This application claims priority from and the benefit of Korean Patent Application No. 10-2023-0103429, filed on Aug. 8, 2023, which is hereby incorporated by reference for all purposes as if set forth herein.

BACKGROUND

Field

Exemplary embodiments relate to an electronic hydraulic brake apparatus, and more particularly, to an electronic hydraulic brake apparatus capable of quickly performing auxiliary braking even when a primary brake fluid is blocked due to the occurrence of an error in primary braking, and thus of improving traveling stability.

Discussion of the Background

Typically, electronic hydraulic brake apparatuses adjust the brake pressure of each wheel using the hydraulic pressure of a master cylinder driven by a motor after the pedal pressure applied by a driver is detected through a sensor.

The electronic hydraulic brake apparatus includes a sensor detecting a stroke distance of a pedal in such a manner as to measure the brake pressure desired by the driver.

In addition, the electronic hydraulic brake apparatus includes a pedal travel simulator that enables the driver to feel the same pedal pressure as in a typical hydraulic brake apparatus.

Accordingly, when the driver presses down a brake pedal, an electronic control unit detects this motion and supplies hydraulic pressure to a master cylinder.

Then, the master cylinder transfers brake hydraulic pressure to a wheel cylinder of each wheel and thus provides a brake force to the wheel.

A problem with an electronic hydraulic brake apparatus in the related art is that it does not quickly provide brake hydraulic pressure to a wheel cylinder, thereby possibly causing an accident. For this reason, there is a need for improvement in this electronic hydraulic brake apparatus.

The related art of the present disclosure is disclosed in Korean Patent Application Publication No. 2007-0104982 (published on Oct. 30, 2007 and entitled "Control Apparatus For Valve In Electro-Hydraulic Brake System")

SUMMARY

Various embodiments, which are made to address the above-mentioned problem, are directed to an electronic hydraulic brake apparatus capable of quickly performing auxiliary braking even when a primary brake fluid is blocked due to the occurrence of an error in primary braking, and thus of improving traveling stability.

In an embodiment, the electronic hydraulic brake apparatus according to the present disclosure includes a primary brake unit providing a brake fluid to a plurality of wheel cylinder units; a storage unit connected to the primary brake unit, the brake fluid being stored in the storage unit; and an auxiliary brake unit selectively connected to the primary brake unit and, in a case where an operating error of the primary brake unit occurs, providing the brake fluid stored in the auxiliary brake unit itself to the wheel cylinder unit.

In an embodiment, in the electronic hydraulic brake apparatus, the auxiliary brake unit may be connected to a hydraulic line of the primary brake unit and may be mounted on the wheel cylinder unit.

In an embodiment, in the electronic hydraulic brake apparatus, the auxiliary brake unit may include: an auxiliary block part; an auxiliary storage part formed in the auxiliary block part, the brake fluid being stored in the auxiliary storage part; an auxiliary circuit part formed on the auxiliary block part and adjusting the brake fluid; and an auxiliary control unit controlling the auxiliary circuit part in such a manner that the brake fluid is provided to the wheel cylinder unit, when an error of the primary brake unit is detected.

In an embodiment, the electronic hydraulic brake apparatus, the auxiliary block part may include: a block body; a primary connection port formed in on the block body and guiding connection to the primary brake unit; and a wheel connection port formed in the block body and guiding connection to the wheel cylinder unit.

In an embodiment, in the electronic hydraulic brake apparatus, the auxiliary storage part may include: a storage chamber formed within the auxiliary block part, the brake fluid being stored in the storage chamber; a storage flow path extending from the storage chamber to a lateral surface of the auxiliary block part, thereby forming a flow path; and a storage stopper opening and closing the storage flow path.

In an embodiment, in the electronic hydraulic brake apparatus, the storage chamber may be initially provided with the brake fluid through the storage flow path, and, according to need, the brake fluid provided by the primary brake unit may be stored in the storage chamber.

In an embodiment, in the electronic hydraulic brake apparatus, the storage stopper may block a flow of fluid while permitting gas to flow, thereby maintaining an internal pressure of the storage chamber at atmospheric pressure.

In an embodiment, in the electronic hydraulic brake apparatus, the storage stopper may be formed of a sintered metal material.

In an embodiment, in the electronic hydraulic brake apparatus, the auxiliary circuit part may include: a first flow path connecting the primary brake unit and the wheel cylinder unit to each other and guiding the brake fluid in the primary brake unit to the wheel cylinder unit; and a second flow path connecting the first flow path and the auxiliary storage part to each other and guiding the brake fluid, stored in the auxiliary storage part, to the wheel cylinder unit.

In an embodiment, in the electronic hydraulic brake apparatus, the first flow path may include: a first line connecting the primary brake unit and the wheel cylinder unit to each other; and a first valve formed on the first line and opening and closing the first line.

In an embodiment, in the electronic hydraulic brake apparatus, one end portion of the first line may be connected to the primary connection port, and the other end portion of the first line may be connected to the wheel connection port.

In an embodiment, in the electronic hydraulic brake apparatus, the second flow path may include: a second line connecting the auxiliary storage part and the first flow path to each other; a second drive part formed on the second line and discharging the brake fluid stored in the auxiliary storage part; and a second valve formed on the second line and opening and closing the second line.

In an embodiment, in the electronic hydraulic brake apparatus, one end portion of the second line may be connected to the auxiliary storage part, and the other end portion of the second line may be connected to the first line that connects the first valve and the wheel cylinder unit 4 to each other.

In an embodiment, in the electronic hydraulic brake apparatus, the second valve may be arranged on the second line that connects the second drive part and the first line to each other.

In an embodiment, in the electronic hydraulic brake apparatus, the auxiliary circuit part may further include a third flow path connecting the first flow path and the auxiliary storage part and guiding the brake fluid.

In an embodiment, in the electronic hydraulic brake apparatus, the third flow path may include: a third line connecting the first flow path and the auxiliary storage part to each other; and a third valve formed on the third line and opening and closing the third line.

In an embodiment, in the electronic hydraulic brake apparatus, one end portion of the third line may be connected to the first flow path that connects the second flow path and the wheel cylinder unit to each other, and the other end portion of the third line may be connected to the auxiliary storage part.

In an embodiment, in the electronic hydraulic brake apparatus, the auxiliary circuit part may further include a fourth flow path connecting the second flow path and the auxiliary storage part to each other and guiding the brake fluid.

In an embodiment, in the electronic hydraulic brake apparatus, the fourth flow path may include: a fourth line connecting the second flow path and the auxiliary storage part to each other; and a fourth valve formed on the fourth line and opening and closing the fourth line.

In an embodiment, in the electronic hydraulic brake apparatus, one end portion of the fourth line may be connected to the second line that connects the second drive part and the second valve to each other, and the other end portion of the fourth line may be connected to the auxiliary storage part.

In the electronic hydraulic brake apparatus according to the present disclosure, the primary brake unit and the auxiliary brake unit are connected to each other using a hydraulic pressure circuit. When an operating error of the primary brake unit occurs, the auxiliary brake unit can be driven, thereby performing braking.

DETAILED DESCRIPTION OF THE ILLUSTRATED EMBODIMENTS

Figure 1:
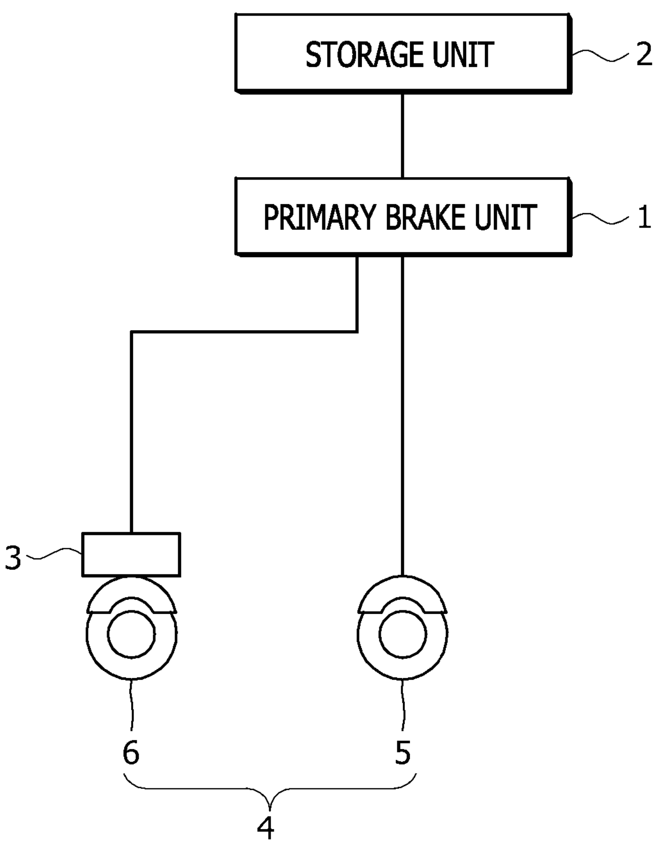
FIG. 1 is a block diagram schematically illustrating an electronic hydraulic brake apparatus of an embodiment of the present disclosure.

An electronic hydraulic brake apparatus according to an embodiment of the present disclosure will be described below with reference to the accompanying drawings. For clarity and convenience in description, thicknesses of lines, sizes of constituent elements, and the like may be illustrated in a non-exact proportion in the drawings. In addition, a term to be assigned to a constituent element according to the present disclosure is defined considering a function of the constituent element and may vary according to a user's intention or a manager's intention or based on practices in the art. Therefore, these terms should be contextually defined in light of the present specification.

Figure 2:
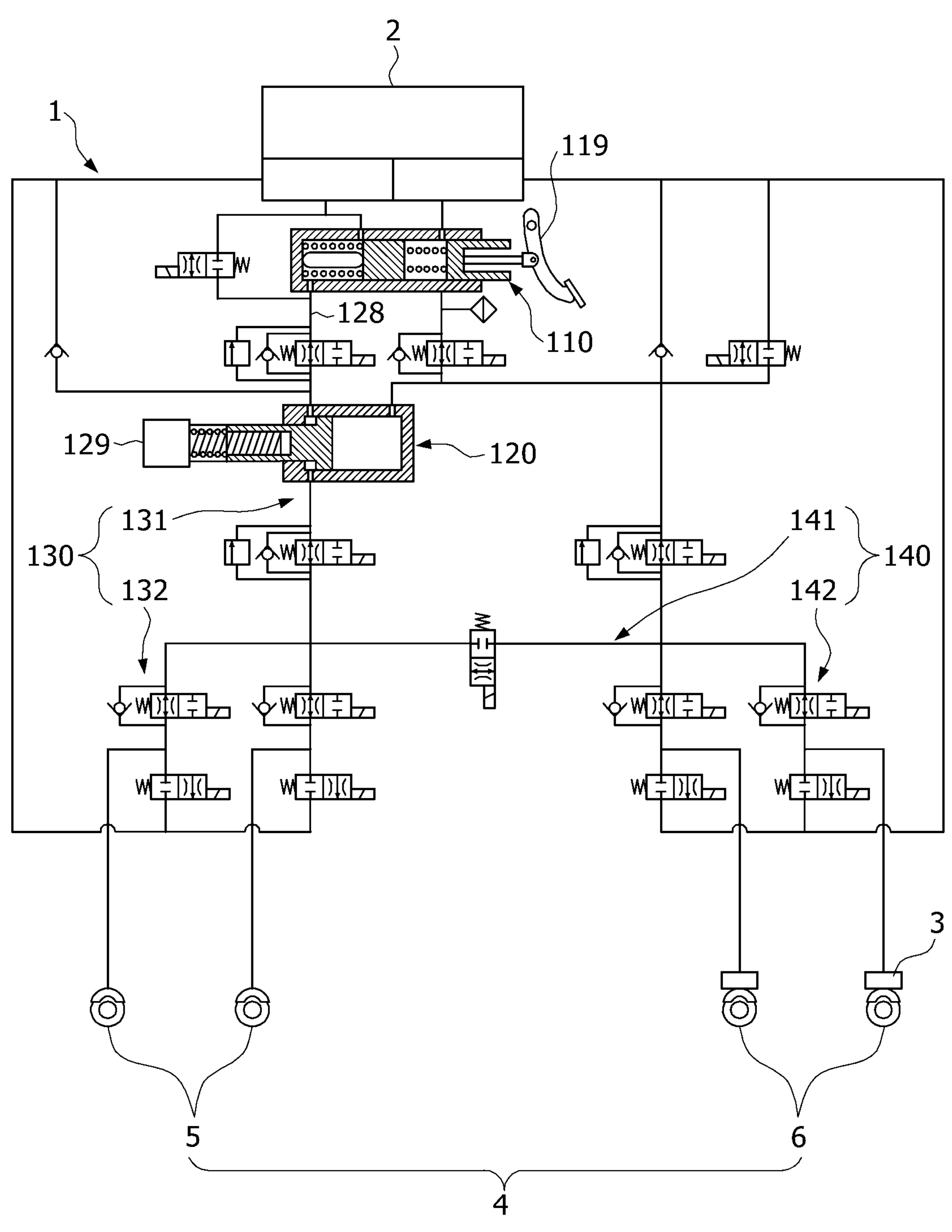
FIG. 2 is a diagram schematically illustrating a primary brake unit of the electronic hydraulic brake apparatus according to the embodiment of the present disclosure.

FIG. 1 is a block diagram schematically illustrating the electronic hydraulic brake apparatus of the embodiment of the present disclosure. FIG. 2 is a diagram schematically illustrating a primary brake unit 1 of the electronic hydraulic brake apparatus according to the embodiment of the present disclosure. With reference to FIGS. 1 and 2, the electronic hydraulic brake apparatus according to the present disclosure the primary brake unit 1, a storage unit 2, and an auxiliary brake unit 3.

The primary brake unit 1 provides a brake fluid to a plurality of wheel cylinder units 4 by driving a motor. The storage unit 2 is connected to the primary brake unit 1, and the brake fluid is temporarily stored in the storage unit 2. The auxiliary brake unit 3 is selectively connected to the primary brake unit 1. In a case where an operating error of the primary brake unit 1 occurs, the auxiliary brake unit 3 may provide the brake fluid stored in the brake unit 3 itself to the wheel cylinder unit 4.

The auxiliary brake unit 3 is connected to a hydraulic line of the primary brake unit 1 and may be mounted on the wheel cylinder unit 4. As an example, the auxiliary brake unit 3 may be selectively mounted on the wheel cylinder unit 4 that needs auxiliary braking.

When the primary brake unit 1 operates normally, the auxiliary brake unit 3 may guide the brake fluid, provided by the primary brake unit 1, to the wheel cylinder unit 4. When the primary brake unit 1 operates abnormally, the auxiliary brake unit 3 may be disconnected from the primary brake unit 1 and may provide the brake fluid stored in the auxiliary brake unit 3 itself to the wheel cylinder unit 4.

The primary brake unit 1 according to the embodiment of the present disclosure may include a pedal cylinder part 110, a master cylinder part 120, a first primary hydraulic part 130, a second primary hydraulic part 140, and a third primary hydraulic part 150.

The pedal cylinder part 110 may generate hydraulic pressure when a pedal 119 is pressed. The pedal cylinder part 110 may form two chambers and may provide a pedal force that corresponds to the pressing of the pedal 119.

The master cylinder part 120 may detect whether or not the pedal 119 operates and may generate a hydraulic pressure by driving the motor 129. The master cylinder part 120 may form one chamber, and the motor 129 may be driven in either a forward or a backward direction according to a pressed state of the pedal 119. The master cylinder part 120 may be connected to the pedal cylinder part 110 with a cylinder line part 128 in between.

The first primary hydraulic part 130 is connected to the master cylinder part 120 and may guide the brake fluid to one or several units among the plurality of wheel cylinder units 4.

More specifically, the first primary hydraulic part 130 may include a (1-1)-st hydraulic line part 131 that is connected to the master cylinder part 120 and guides the brake fluid, and a (1-2)-st hydraulic line part 132 that branches off from the (1-1)-st hydraulic line part 131 and guides the brake fluid to a first wheel cylinder unit 5. In this case, two first wheel cylinder units 5 may be arranged on rear wheels, respectively.

The second primary hydraulic part 140 connects the master cylinder part 120 and the auxiliary brake unit 3 to each other and may guide brake hydraulic pressure to the remaining units among the plurality of wheel cylinder units 4.

More specifically, the second primary hydraulic part 140 may include a (2-1)-nd hydraulic line part 141 that is connected to the master cylinder part 120 and guides the brake hydraulic pressure, and a (2-2)-nd hydraulic line part 142 that branches off from the (2-1)-nd hydraulic line part 141 and guides the brake fluid to the auxiliary brake unit 3. In this case, the auxiliary brake unit 3 may be mounted on a second wheel cylinder unit 6, and two second wheel cylinder units 6 may be arranged on front wheels, respectively.

The first wheel cylinder unit 5 may be arranged on the front wheel. The second wheel cylinder unit 6 may be arranged on the rear wheel. The auxiliary brake unit 3 may be provided, in a vehicle driving manner, to a primary motive-powered wheel. In addition, the auxiliary brake units 3 may be mounted on the first wheel cylinder unit 5 and the second wheel cylinder unit 6, respectively.

Figure 3:
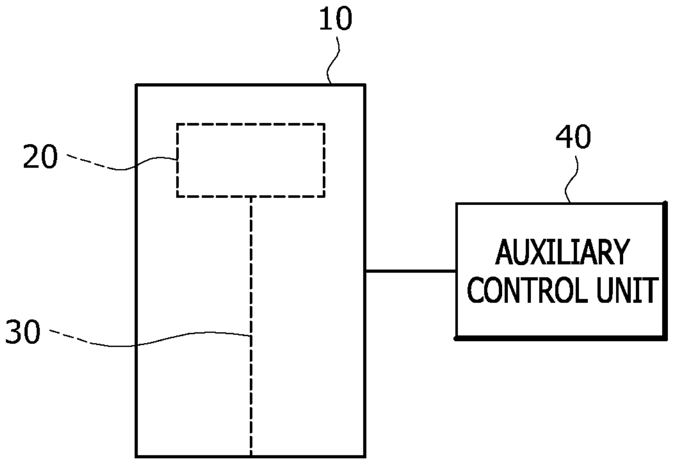
FIG. 3 is a block diagram schematically illustrating an auxiliary brake unit according to the embodiment of the present disclosure.

FIG. 3 is a block diagram schematically illustrating the auxiliary brake unit 3 according to the embodiment of the present disclosure. With reference to FIG. 3, the auxiliary brake unit 3 according to the embodiment of the present disclosure may include an auxiliary block part 10, an auxiliary storage part 20, an auxiliary circuit part 30, and an auxiliary control unit 40.

The auxiliary block part 10 may be mounted on the wheel cylinder unit 4. As an example, the auxiliary block part 10 may be integrally connected to the wheel cylinder unit 4 or may be coupled to the wheel cylinder unit 4. In addition, the auxiliary block part 10 may be mounted on a hub bearing.

The auxiliary storage part 20 may be formed in the auxiliary block part 10, and the brake fluid may be stored in the auxiliary storage part 20. As an example, the auxiliary storage part 20 may be formed within the auxiliary block part 10.

The auxiliary circuit part 30 may be formed on the auxiliary block part 10 and may adjust the brake fluid. As an example, the auxiliary circuit part 30 may be formed within the auxiliary block part 10 and may regulate a flow of the brake fluid. The auxiliary circuit part 30 is connected to the primary brake unit 1, the wheel cylinder unit 4, and the auxiliary storage part 20 and may guide the flow of the brake fluid.

When an error of the primary brake unit 1 is detected, the auxiliary control unit 40 may control the auxiliary circuit part 30 in such a manner that the brake fluid present in the auxiliary circuit part 30 is provided to the wheel cylinder unit 4. As an example, the auxiliary control unit 40 may control the auxiliary circuit part 30 in such a manner as to guide the brake fluid in the primary brake unit 1 to the wheel cylinder unit 4. In addition, the auxiliary control unit 40 may disconnect the auxiliary storage part 20 from the primary brake unit 1 and may control the auxiliary circuit part 30 in such a manner as to guide the brake fluid stored in the auxiliary storage part 20 to the wheel cylinder unit 4.

Figure 4:
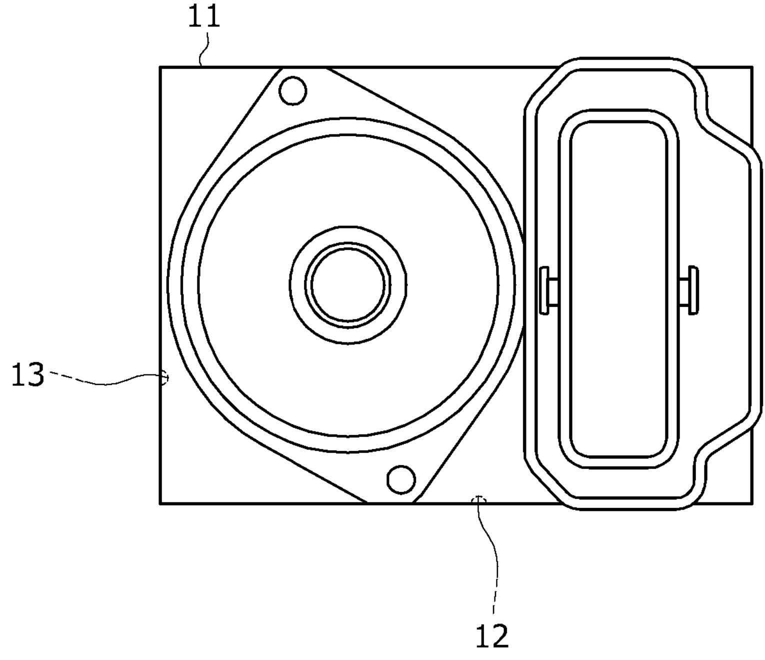
FIG. 4 is a diagram schematically illustrating an auxiliary block part according to the embodiment of the present disclosure.

FIG. 4 is a diagram schematically illustrating the auxiliary block part 10 according to the embodiment of the present disclosure. With reference to FIG. 4, the auxiliary block part 10 according to the embodiment of the present disclosure may include a block body 11, a primary connection port 12, and a wheel connection port 13.

The block body 11 may be manufactured using an extrusion method and may be configured as a regular hexahedral block formed of aluminum alloy. The block body 11 may be directly connected to the wheel cylinder unit 4 and may be mounted on the wheel cylinder unit 4 with a separate connector in between.

The primary connection port 12 may be formed in the block body 11 and may guide connection to the primary brake unit 1. The wheel connection port 13 may be formed in the block body 11 and may guide connection to the wheel cylinder unit 4. As an example, the primary connection port 12 and the wheel connection port 13 may be formed at various points on the block body 11, depending on design requirements.

Figure 5:
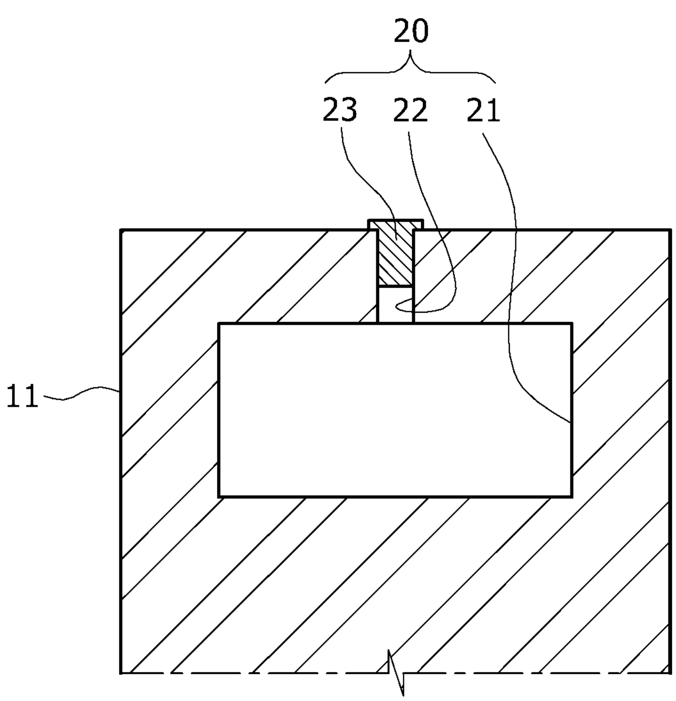
FIG. 5 is a diagram schematically illustrating an auxiliary storage part according to the embodiment of the present disclosure.

FIG. 5 is a diagram schematically illustrating the auxiliary storage part 20 according to the embodiment of the present disclosure. With reference to FIG. 5, the auxiliary storage part 20 according to the embodiment of the present disclosure may include a storage chamber 21, a storage flow path 22, and a storage stopper 23.

The storage chamber 21 may be formed within the auxiliary block part 10 and may provide a space where the brake fluid is stored. As an example, the storage chamber 21 may form a space in an area other than the auxiliary circuit part 30 that is formed within the block body 11. In addition, the storage chamber 21 may be manufactured as a separate chamber and may be mounted on the block body 11.

The storage flow path 22 may extend from the storage chamber 21 to a lateral surface of the auxiliary block part 10, thereby forming a flow path. As an example, the storage flow path 22 may be a hole that communicates with the storage chamber 21, starting from an outer surface of the block body 11.

The storage stopper 23 may open and close the storage flow path 22. As an example, the storage stopper 23 may be forced into the storage flow path 22 or removably attached thereinto and thus blocks the brake fluid, stored in the storage chamber 21, from leaking to the outside through the storage flow path 22.

The storage chamber 21 may be initially provided with the brake fluid through the storage flow path 22, and the brake fluid may be stored in the storage chamber 21. According to need, the brake fluid provided by the primary brake unit 1 may be stored in the storage chamber 21.

The storage stopper 23 may block a flow of fluid while permitting gas to flow, thereby maintaining the internal pressure of the storage chamber 21 at atmospheric pressure. As an example, the storage stopper 23 may be formed of a sintered metal material.

Figure 6:
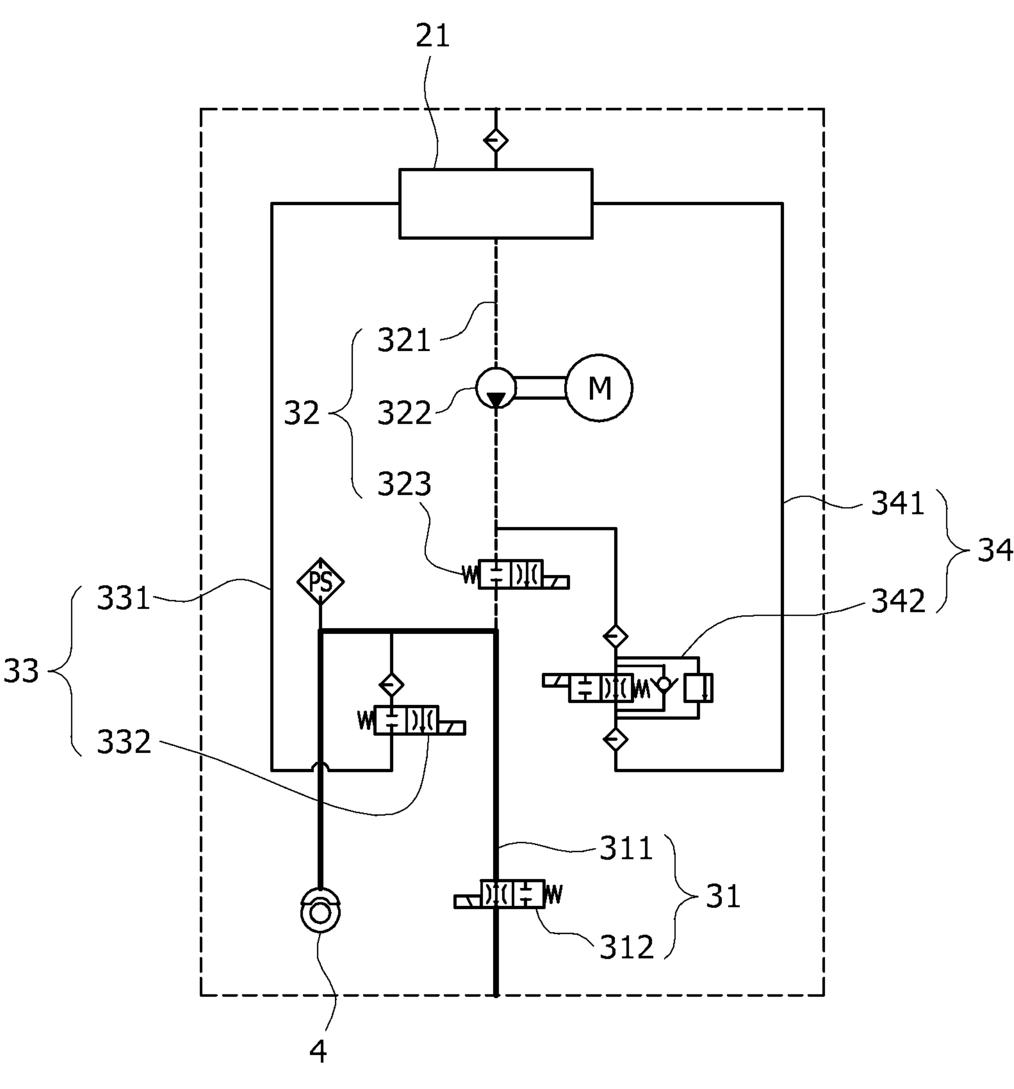
FIG. 6 is a diagram schematically illustrating an auxiliary circuit part according to the embodiment of the present disclosure.

FIG. 6 is a diagram schematically illustrating the auxiliary circuit part 30 according to the embodiment of the present disclosure. With reference to FIG. 6, the auxiliary circuit part 30 according to the embodiment of the present disclosure may include a first flow path 31 and a second flow path 32.

The first flow path 31 connects the primary brake unit 1 and the wheel cylinder unit 4 to each other and may guide the brake fluid) in the primary brake unit 1 to the wheel cylinder unit 4. As an example, one end portion of the first flow path 31 may communicate with the primary connection port 12, and the other end portion thereof may communicate with the wheel connection port 13.

The second flow path 32 connects the first flow path 31 and the auxiliary storage part 20 to each other and may guide the brake fluid, stored in the auxiliary storage part 20, to the wheel cylinder unit 4. As an example, the second flow path 32 may be connected to the storage chamber 21.

More specifically, the first flow path 31 may include a first line 311 and a first valve 312.

The first line 311 may connect the primary brake unit 1 and the wheel cylinder unit 4 to each other. As an example, one end portion of the first line 311 may be connected to the primary connection port 12, and the other end portion thereof may be connected to the wheel connection port 13.

The first valve 312 may be formed on the first line 311 and may open and close the first line 311. As an example, the first valve 312 may be a normal open valve. The first valve 312, when not powered, may open the first line 311, and thus the brake fluid in the primary brake unit 1 may reach the wheel cylinder unit 4.

The second flow path 32 may include a second line 321, a second drive part 322, and a second valve 323.

The second line 321 may connect the auxiliary storage part 20 and the first flow path 31 to each other. As an example, one end portion of the second line 321 may be connected to the storage chamber 21, and the other end portion thereof may be connected to the first line 311 that connects the first valve 312 and the wheel cylinder unit 4 to each other.

The second drive part 322 may be formed on the second line 321 and may discharge the brake fluid stored in the auxiliary storage part 20. As an example, the second drive part 322 may be an oil pump or an actuator that increases the hydraulic pressure of the brake fluid.

The second valve 323 may be formed on the second line 321 and may open and close the second line 321. As an example, the second valve 323 may be arranged on the second line 321 that connects the second drive part 322 and the first line 311 to each other. The second valve 323 may be a normal closed valve. The second valve 323, when not powered, may close the second line 321.

The auxiliary circuit part 30 according to the embodiment of the present disclosure may further include a third flow path 33 and a fourth flow path 34.

The third flow path 33 may guide the brake fluid by connecting the first flow path 31 and the auxiliary storage part 20 to each other. The third flow path 33 may include a third line 331 and a third valve 332.

The third line 331 connects the first flow path 31 and the auxiliary storage part 20 to each other. The third valve 332 may be formed on the third line 331 and may open and close the third line 331.

One end portion of the third line 331 may be connected to the first flow path 31 that connects the second flow path 32 and the wheel cylinder unit 4 to each other. The other end portion of the third line 331 may be connected to the storage chamber 21 of the auxiliary storage part 20.

The fourth flow path 34 may guide the brake fluid by connecting the second flow path 32 and the auxiliary storage part 20 to each other. The fourth flow path 34 may include a fourth line 341 and a fourth valve 342.

One end portion of the fourth line 341 may be connected to the second line 321 that connects the second drive part 322 and the second valve 323 to each other. The other end portion of the fourth line 341 may be connected to the storage chamber 21 of the auxiliary storage part 20. The fourth valve 342 may open and close the fourth line 341. The fourth valve 342 may be automatically opened and closed according to preset pressure.

Figure 7:
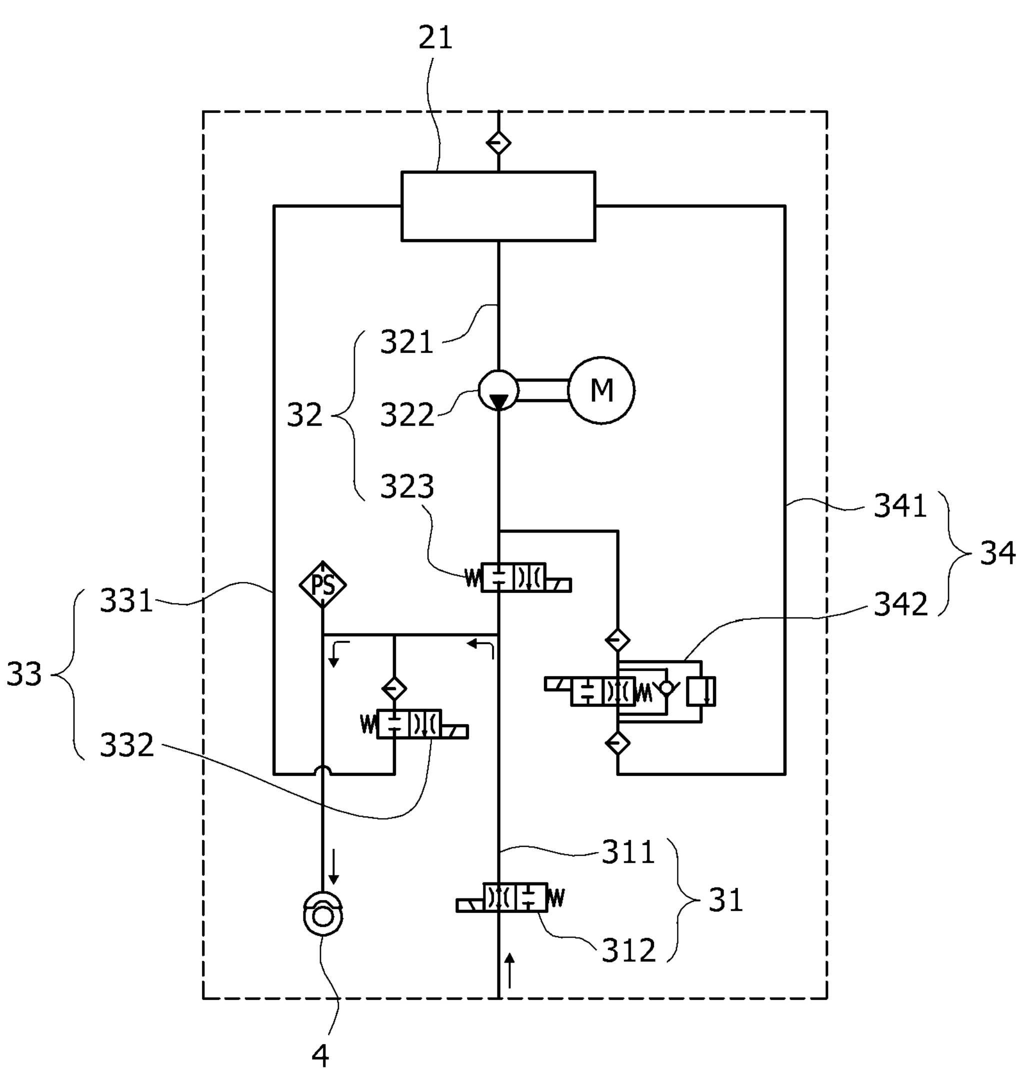
FIG. 7 is a diagram schematically illustrating a hydraulic state of the auxiliary circuit part that appears when the primary brake unit according to the embodiment of the present disclosure is in a normal state.

FIG. 7 is a diagram schematically illustrating a hydraulic state of the auxiliary circuit part 30 that appears when the primary brake unit 1 according to the embodiment of the present disclosure is in a normal state. With reference to FIG. 7, in a case where the primary brake unit 1 is in the normal state, the auxiliary brake unit 3 opens a flow path in such a manner that the brake fluid in the primary brake unit 1 is provided to the wheel cylinder unit 4.

That is, the first valve 312 opens the first line 311 and the second valve 323 closes the second line 321. Then, the third valve 332 closes the third line 331, and the fourth valve 342 opens or closes the fourth line 341 according to a preset hydraulic pressure.

In the above-mentioned state, the brake fluid in the primary brake unit 1 reaches the wheel cylinder unit 4 through the first line 311.

Figure 8:
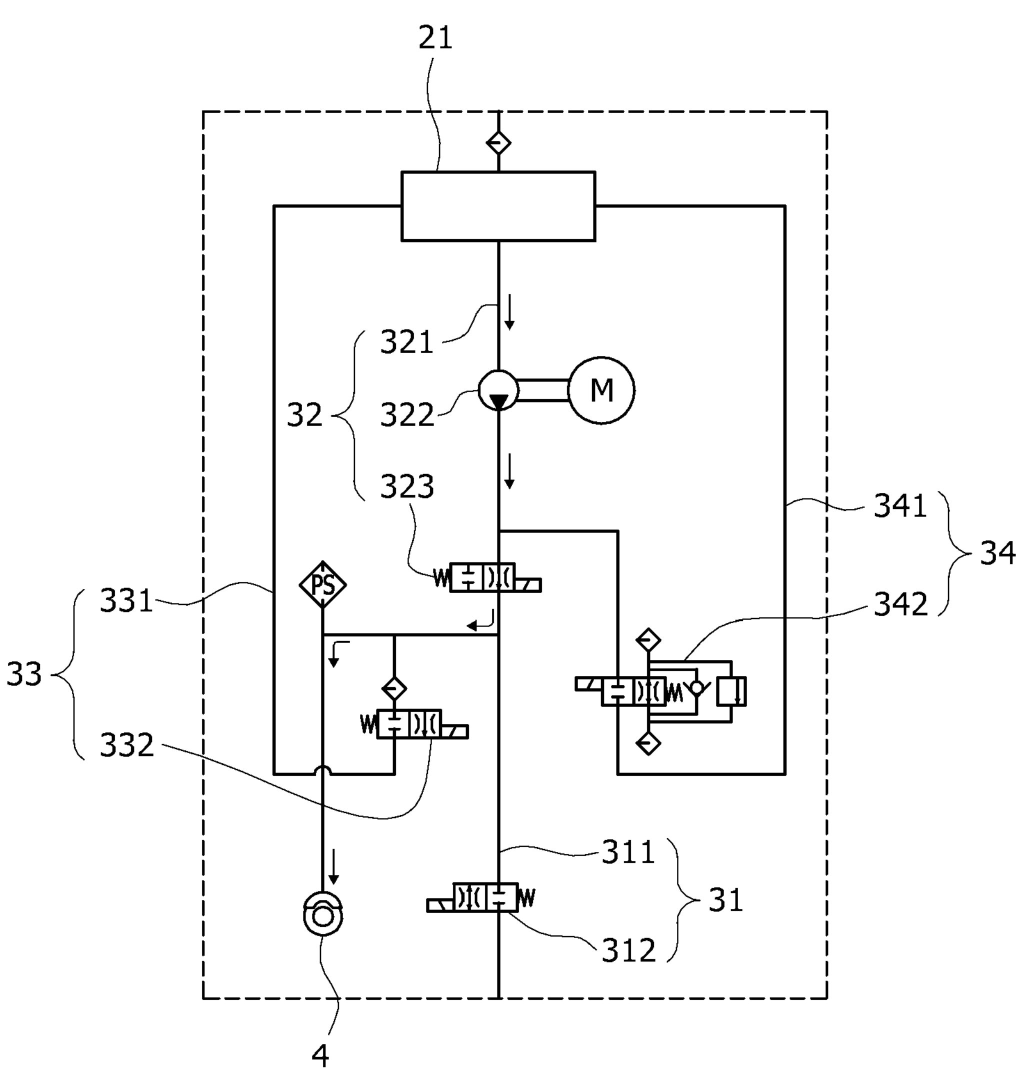
FIG. 8 is a diagram schematically illustrating a pressure-pressure state that is attained through the auxiliary circuit part when the primary brake unit according to the embodiment of the present disclosure is in an abnormal state.

FIG. 8 is a diagram schematically illustrating a pressure-pressure state that is attained through the auxiliary circuit part 30 when the primary brake unit 1 according to the embodiment of the present disclosure is in an abnormal state. With reference to FIG. 8, in a case where the primary brake unit 1 is in the abnormal state, inflow and outflow of the brake fluid in the primary brake unit 1 are regulated, and the auxiliary brake unit 3 provides the brake fluid to the wheel cylinder unit 4.

That is, the first valve 312 closes the first line 311, the second valve 323 opens the second line 321, and the second drive part 322 is driven. Then, the third valve 332 closes the third line 331, and the fourth valve 342 opens or closes the fourth line 341 according to the preset hydraulic pressure.

In the above-mentioned state, the hydraulic pressure of the brake fluid stored in the storage chamber 21 is increased when the second drive part 322 is driven, and the brake fluid reaches the wheel cylinder unit 4 through the second line 321 and the first line 311.

Figure 9:
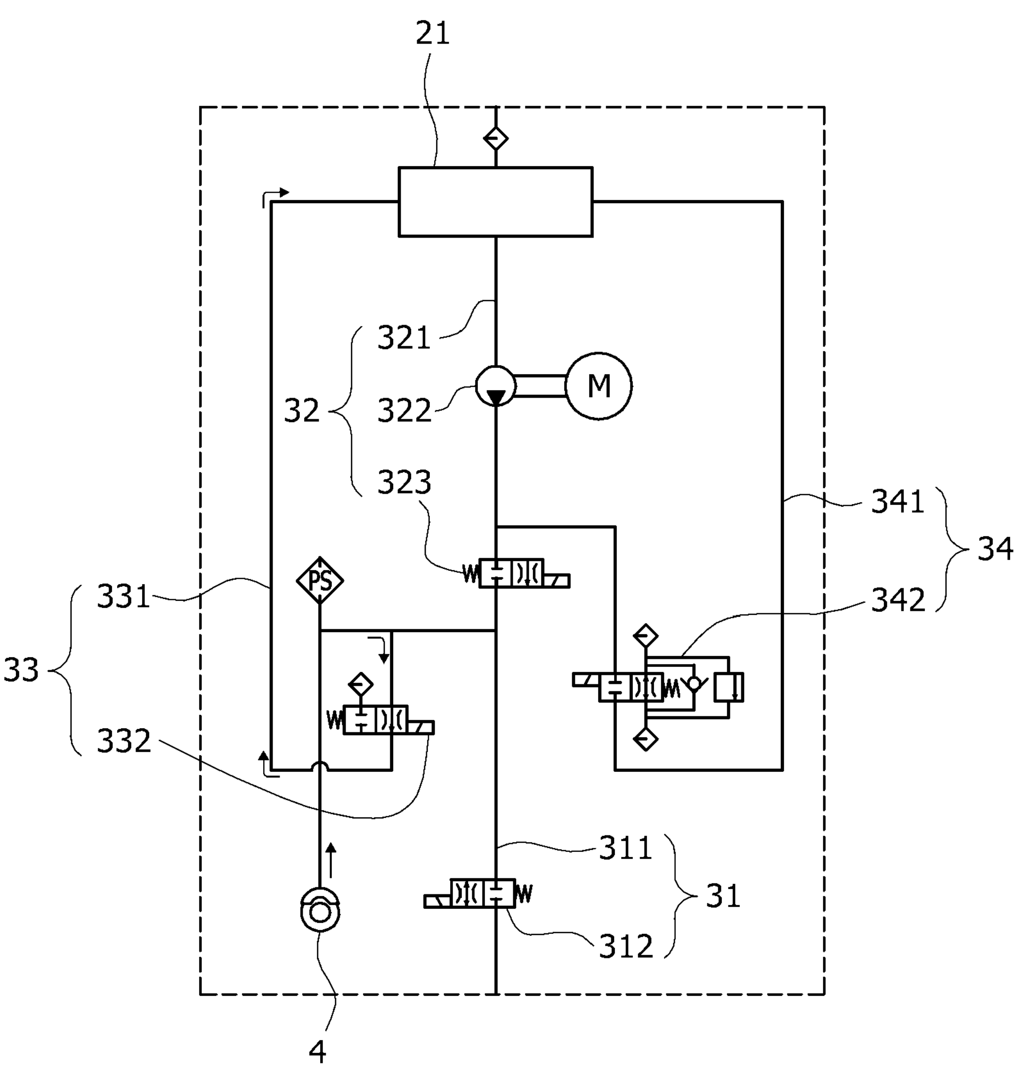
FIG. 9 is a diagram schematically illustrating a pressure-decreased state that is attained through the auxiliary circuit part when the primary brake unit according to the embodiment of the present disclosure is in the abnormal state.

FIG. 9 is a diagram schematically illustrating a pressure-decreased state that is attained through the auxiliary circuit part 30 when the primary brake unit 1 according to the embodiment of the present disclosure is in the abnormal state. With reference to FIG. 9, in a case where the primary brake unit 1 is in the abnormal state, the inflow and outflow of the brake fluid in the primary brake unit 1 are regulated, and the auxiliary brake unit 3 guides the brake fluid in the wheel cylinder unit 4 to the storage chamber 21.

That is, the first valve 312 closes the first line 311, the second valve 323 closes the second line 321, and the second drive part 322 is driven or stopped. Then, the third valve 332 opens the third line 331, and the fourth valve 342 opens or closes the fourth line 341 according to the preset hydraulic pressure.

In the above-mentioned state, the brake fluid in the wheel cylinder unit 4 is recovered into the storage chamber 21 through the first line 311 and the third line 331.

In the electronic hydraulic brake apparatus according to the embodiment of the present disclosure, the primary brake unit 1 and the auxiliary brake unit 3 are connected to each other using a hydraulic circuit. In the case where the operating error of the primary brake unit 1 occurs, the auxiliary brake unit 3 may be driven, thereby performing braking.

The embodiment of the present disclosure is described only in an exemplary manner with reference to the drawings. It would be understood by a person of ordinary skill in the art to which the present disclosure pertains that various modifications could be made to the embodiment and that various equivalents thereof could be implemented.

Therefore, the proper technical scope of the present disclosure should be defined by the following claims.

What is claimed is:

1. An electronic hydraulic brake apparatus comprising:

a primary brake unit configured to provide a brake fluid to a wheel cylinder unit;

a storage unit connected to the primary brake unit and configured to store the brake fluid; and an auxiliary brake unit connected to a hydraulic line of the primary brake unit, and configured to selectively disconnect from the primary brake unit and provide additional brake fluid which is stored separately within the auxiliary brake unit without being hydraulically connected to the storage unit, to the wheel cylinder unit in a case where an operating error of the primary brake unit occurs.

2. The electronic hydraulic brake apparatus of claim 1, wherein the auxiliary brake unit is mounted on the wheel cylinder unit.

3. The electronic hydraulic brake apparatus of claim 1, wherein the auxiliary brake unit comprises:

an auxiliary block part;

an auxiliary storage part disposed in the auxiliary block part, and configured to store the additional brake fluid;

an auxiliary circuit part disposed on the auxiliary block part and configured to adjust the additional brake fluid; and an auxiliary controller configured to control the auxiliary circuit part to provide the additional brake fluid stored in the auxiliary brake unit to the wheel cylinder unit, when the operating error of the primary brake unit is detected.

4. The electronic hydraulic brake apparatus of claim 3, wherein the auxiliary block part comprises:

a block body;

a primary connection port disposed in the block body and configured to guide connection to the primary brake unit; and a wheel connection port disposed in the block body and configured to guide connection to the wheel cylinder unit.

5. The electronic hydraulic brake apparatus of claim 4, wherein the auxiliary circuit part comprises:

a first flow path connecting the primary brake unit and the wheel cylinder unit to each other and configured to guide the brake fluid in the primary brake unit to the wheel cylinder unit; and a second flow path connecting the first flow path and the auxiliary storage part to each other and configured to guide the additional brake fluid, stored in the auxiliary storage part, to the wheel cylinder unit.

6. The electronic hydraulic brake apparatus of claim 5, wherein the first flow path comprises:

a first line connecting the primary brake unit and the wheel cylinder unit to each other; and a first valve disposed on the first line and configured to open and close the first line.

7. The electronic hydraulic brake apparatus of claim 6, wherein one end portion of the first line is connected to the primary connection port, and the other end portion of the first line is connected to the wheel connection port.

8. The electronic hydraulic brake apparatus of claim 5, wherein the second flow path comprises:

a second line connecting the auxiliary storage part and the first flow path to each other;

a second drive part disposed on the second line and configured to discharge the additional brake fluid stored in the auxiliary storage part; and a second valve disposed on the second line and configured to open and close the second line.

9. The electronic hydraulic brake apparatus of claim 8, wherein one end portion of the second line is connected to the auxiliary storage part, and the other end portion of the second line is connected to the first line that connects the first valve and the wheel cylinder unit to each other.

10. The electronic hydraulic brake apparatus of claim 9, wherein the second valve is arranged on the second line that connects the second drive part and the first line to each other.

11. The electronic hydraulic brake apparatus of claim 8, wherein the auxiliary circuit part further comprises:

a fourth flow path connecting the second flow path and the auxiliary storage part to each other and guiding the additional brake fluid.

12. The electronic hydraulic brake apparatus of claim 11, wherein the fourth flow path comprises:

a fourth line connecting the second flow path and the auxiliary storage part to each other; and a fourth valve disposed on the fourth line and configured to open and close the fourth line.

13. The electronic hydraulic brake apparatus of claim 12, wherein one end portion of the fourth line is connected to the second line that connects the second drive part and the second valve to each other, and the other end portion of the fourth line is connected to the auxiliary storage part.

14. The electronic hydraulic brake apparatus of claim 5, wherein the auxiliary circuit part further comprises:

a third flow path connecting the first flow path and the auxiliary storage part and configured to guide the additional brake fluid.

15. The electronic hydraulic brake apparatus of claim 14, wherein the third flow path comprising:

a third line connecting the first flow path and the auxiliary storage part to each other; and a third valve disposed on the third line and configured to open and close the third line.

16. The electronic hydraulic brake apparatus of claim 15, wherein one end portion of the third line is connected to the first flow path that connects the second flow path and the wheel cylinder unit to each other, and the other end portion of the third line is connected to the auxiliary storage part.

17. An electronic hydraulic brake apparatus comprising:

a primary brake unit configured to provide a brake fluid to a wheel cylinder unit;

a storage unit connected to the primary brake unit and configured to store the brake fluid; and an auxiliary brake unit selectively connected to the primary brake unit, and configured to provide additional brake fluid stored in the auxiliary brake unit to the wheel cylinder unit in a case where an operating error of the primary brake unit occurs, wherein the auxiliary brake unit comprises an auxiliary block part and an auxiliary storage part disposed in the auxiliary block part and configured to store the additional brake fluid, wherein the auxiliary storage part comprises:

a storage chamber disposed within the auxiliary block part, and configured to store the additional brake fluid;

a storage flow path extending from the storage chamber to a lateral surface of the auxiliary block part, thereby forming a flow path; and a storage stopper configured to open and close the storage flow path.

18. The electronic hydraulic brake apparatus of claim 17, wherein the storage chamber is initially provided with the brake fluid through the storage flow path, and the brake fluid provided by the primary brake unit as the additional brake fluid is configured to be stored in the storage chamber.

19. The electronic hydraulic brake apparatus of claim 17, wherein the storage stopper configured to block a flow of fluid while permitting gas to flow so as to maintain an internal pressure of the storage chamber at atmospheric pressure.

20. The electronic hydraulic brake apparatus of claim 17, wherein the storage stopper is made of a sintered metal material.

* * * * *